US006037587A

United States Patent [19]

Dowell et al.

[11] Patent Number: 6,037,587

[45] Date of Patent: Mar. 14, 2000

[54] CHEMICAL IONIZATION SOURCE FOR MASS SPECTROMETRY

[75] Inventors: Jerry T. Dowell, Portola Valley; Jeffery S. Hollis, San Jose; Charles W. Russ, IV, Sunnyvale, all of Calif.

[73] Assignee: Hewlett-Packard Company, Palo Alto, Calif.

[21] Appl. No.: 08/951,951

[22] Filed: Oct. 17, 1997

[51] Int. Cl.[7] .............................. B01D 59/44; H01J 49/00

[52] U.S. Cl. .............................. 250/288; 250/423 R

[58] Field of Search .............................. 250/281, 282, 250/288, 423 R

[56] References Cited

U.S. PATENT DOCUMENTS

| | | | |
|---|---|---|---|
| 3,265,889 | 8/1966 | Doctoroff | 250/41.9 |
| 3,356,843 | 12/1967 | McElligott | 250/41.9 |
| 3,423,584 | 1/1969 | Erickson | 250/41.9 |
| 3,461,285 | 8/1969 | Werner | 250/41.9 |
| 3,553,451 | 1/1971 | Uthe | 250/41.9 |
| 3,930,163 | 12/1975 | Gerlach et al. | 250/398 |
| 4,032,782 | 6/1977 | Smith et al. | 250/292 |
| 4,041,346 | 8/1977 | Bursey et al. | 313/336 |
| 4,079,254 | 3/1978 | Lawrence, Jr. et al. | 250/292 |
| 4,202,080 | 5/1980 | Holzl et al. | 29/25.18 |
| 4,500,787 | 2/1985 | Le Poole et al. | 250/427 |
| 4,529,571 | 7/1985 | Bacon et al. | 376/144 |
| 4,538,067 | 8/1985 | Cuomo et al. | 250/396 |
| 4,620,102 | 10/1986 | Watanabe et al. | 250/427 |
| 4,760,262 | 7/1988 | Sampayan et al. | 250/423 |
| 4,845,367 | 7/1989 | Amirav et al. | 250/423 |
| 4,847,476 | 7/1989 | Sato et al. | 250/427 |
| 4,883,969 | 11/1989 | Ishida et al. | 250/427 |
| 5,055,678 | 10/1991 | Taylor et al. | 250/291 |
| 5,198,677 | 3/1993 | Leung et al. | 250/423 R |
| 5,252,892 | 10/1993 | Koshiishi et al. | 250/423 R |
| 5,296,714 | 3/1994 | Treglio | 250/492.3 |
| 5,304,799 | 4/1994 | Kurzweg | 250/296 |
| 5,309,064 | 5/1994 | Armini | 250/423 R |
| 5,343,047 | 8/1994 | Ono et al. | 250/398 |
| 5,384,461 | 1/1995 | Jullien et al. | 250/292 |
| 5,447,763 | 9/1995 | Gehlke | 428/34.1 |
| 5,561,292 | 10/1996 | Buckley et al. | 250/288 |
| 5,563,418 | 10/1996 | Leung | 250/492.21 |
| 5,629,519 | 5/1997 | Palermo | 250/292 |
| 5,633,497 | 5/1997 | Brittain et al. | 250/292 |
| 5,644,131 | 7/1997 | Hansen | 250/292 |
| 5,650,203 | 7/1997 | Gehlke | 428/34.1 |
| 5,663,561 | 9/1997 | Franzen et al. | 250/288 |

FOREIGN PATENT DOCUMENTS

| | | | |
|---|---|---|---|
| 57-109238 | 7/1982 | Japan | H01J 27/08 |
| 60-20442 | 2/1985 | Japan | H01J 49/14 |
| 2146170A | 4/1985 | Japan | H01J 49/10 |
| 60-262334 | 12/1985 | Japan | H01J 27/08 |
| 2-123657 | 5/1990 | Japan | H01J 49/06 |
| 9-63534 | 3/1997 | Japan | H01J 49/10 |

*Primary Examiner*—Bruce C. Anderson

[57] ABSTRACT

A mass spectrometer having an ionization source containing a chemical ionization chamber, wherein the inner surfaces of the chamber are formed from molybdenum to reduce adsorption, degradation and decomposition of an analyte and to reduce adverse ion/surface reactions is disclosed. A method of reducing adsorption, degradation and decomposition of an analyte and reducing adverse ion/surface reactions in an ionization source containing a chemical ionization chamber of a mass spectrometer including the step of forming the inner surfaces of the chamber from molybdenum is also disclosed. The inner surfaces may formed from molybdenum by constructing the entire chamber or the inner surfaces of the chamber from molybdenum; by depositing, plating or coating molybdenum on the inner surfaces of the chamber; or by a combination thereof. Suitable forms of molybdenum include solid molybdenum, mixtures containing at least 10% by weight molybdenum, and reaction products containing molybdenum.

34 Claims, 9 Drawing Sheets

CHEMICAL IONIZATION SOURCE FOR MASS SPECTROMETRY

FIELD OF THE INVENTION

This invention relates to the field of mass spectrometry, and more particularly to a chemical ionization source for mass spectrometry.

BACKGROUND OF THE INVENTION

A mass spectrometer generally contains the following components:

(1) a device to introduce the sample to be analyzed (hereinafter referred to as "analyte"), such as a gas chromatograph;

(2) an ionization source containing a chamber which produces ions from the analyte;

(3) at least one analyzer or filter which separates the ions according to their mass-to-charge ratio;

(4) a detector which measures the abundance of the ions; and (5) a data processing system that produces a mass spectrum of the analyte.

In operation, the analyte is introduced into the ionization source containing the chamber in gaseous form and partially ionized by the ionization source. The resultant ions are then separated by their mass-to-charge ratio in the mass analyzer or filter and collected in the detector.

There are many types of ionization sources useful in mass spectrometry including electron impact, chemical ionization, fast ion or atom bombardment, field desorption, laser desorption, plasma desorption, thermospray, electrospray and inductively coupled plasma. Two of the most widely used ionization sources for analytes containing organic compounds are the electron impact (hereinafter referred to as "EI") and chemical ionization (hereinafter referred to as "CI") sources.

An EI source generally contains a heated filament giving off electrons which are accelerated toward an anode and which collide with the gaseous analyte molecules introduced into the ionization chamber. Typically, the electrons have an energy of about 70 eV and produce ions with an efficiency of less than a few percent. The total pressure within the ionization source is normally held at less than about $10^{-3}$ torr. The ions produced are extracted from the EI source with an applied electric field and generally do not collide with other molecules or surfaces from the time they are formed in the EI source until the time they are collected in the detector.

In contrast to the EI source, a CI source actually produces ions through a collision of the molecules in the analyte with primary ions present in the ionization chamber or by attachment of low energy electrons present in the chamber. A CI source operates at much higher pressures, typically from about 0.2 to about 2 torr, than the EI source operates in order to permit frequent collisions. This pressure may be attributed to the flow of a reagent gas, such as methane, isobutane, ammonia or the like, which is pumped into the chamber containing the CI source. In a typical configuration, both the reagent gas and the analyte are introduced into the chamber containing the CI source through gas-tight seals. The reagent gas and the analyte are sprayed with electrons having an energy of 50 to 300 eV from a filament through a small orifice, generally less than 1 mm in diameter. Ions formed are extracted through a small orifice, generally less than 1 mm in diameter, and introduced into the analyzer or filter. Electric fields may be applied inside the CI source, but they are usually not necessary for operation of the CI source. Ions eventually leave the CI source through a combination of diffusion and entrainment in the flow of the reagent gas.

In the chemical ionization chamber of the CI source, the pressure attributable to the analyte amounts to only a small fraction of the pressure attributable to the reagent gas. As a result, the electrons which are sprayed into the chamber preferentially ionize the reagent gas molecules through electron impact. The resulting ions collide with other reagent gas molecules, occasionally reacting to form other species of ions. These reactions can include proton transfer, additions, hydride abstractions, charge transfers and the like. Negative ions can be formed by attachment of slow electrons to analyte molecules. The positive ions, together with the primary and secondary electrons, form a plasma in the chamber.

The positive ions of the analyte are produced in multiple steps. First, positive ions of the reagent gas molecules are formed by electron impact. Subsequently, the positive ions of the reagent gas molecules are converted to other ion species (hereinafter referred to as "reagent ions") by ion-molecule reactions. The reagent ions then react with molecules in the analyte to form positive ions characteristic of the molecules in the analyte which are then analyzed.

The negative ions of the analyte are produced differently than the positive ions. The ionization plasma contains low-energy or thermal electrons which are either electrons that were used for the ionization to form the positive ions and later slowed, or electrons produced by ionization reactions. These low-energy electrons, typically in the range of 0 to about 10 eV, then react with the molecules of the analyte to form negative ions characteristic of the molecules in the analyte either through direct attachment (capture) or dissociative attachment of an electron.

In CI, the character and quantity of analyzable ions from the molecules in the analyte depend upon reactions occurring on the inner surfaces of the chamber containing the ionization source. For example, the analyte can degrade, i.e., convert to other compounds, or can simply adsorb onto the surface of the chamber and desorb at a later time. Depending upon the compound, many unexpected ions can appear as a result of the catalytic processes involving the surfaces. The result is apparent chromatographic peak-tailing, loss of sensitivity, nonlinearity, erratic performance and the like. Therefore, cleanliness is critical to the proper performance of the mass spectrometer using a CI source, particularly when performing quantitative analysis of low level materials, such as for gas chromatography/mass spectrometer analysis of pesticide residues, drug residues and metabolites, and trace analysis of organic compounds.

Efforts have been made to address sample degradation problems in the ionization chamber of a mass spectrometer by substituting or modifying the surfaces of the ionization chamber. For example, U.S. Pat. No. 5,055,678 discloses the use of a chromium or oxidized chromium surface in a sample analyzing and ionizing apparatus, such as an ion trap or ionization chamber, to prevent degradation or decomposition of a sample in contact with the surface. U.S. Pat. No. 5,633,497 discloses the use of a coating of an inert, inorganic non-metallic insulator or semiconductor material on the interior surfaces of an ion trap or ionization chamber to reduce adsorption, degradation or decomposition of a sample in contact with the surface. Furthermore, coating the inner surface of the ionization chamber with materials known for corrosion resistance or inertness, such as gold, nickel and rhodium, may improve degradation of analytes, such as pesticides, drugs and metabolites, to some degree.

Others have attempted to prevent degradation problems by treating the inner metal surfaces of the analytical apparatus with a passivating agent to hide or destroy active surface sites. For example, alkylchlorosilanes and other silynizing agents have been used to treat injectors, chromatographic columns, transfer lines and detectors in gas chromatography. Such treatments have been successful in deactivating metal surfaces and thus have prevented degradation. Unfortunately, the materials used for such treatments have a sufficiently high vapor pressure to produce organic materials in the gas phase within the volume of the ionization chamber and are ionized along with the analyte, producing a high chemical background in the mass spectrum.

Others have formed the ionization chamber with electropolished stainless steel surfaces. However, mass spectrometers using such ionization chambers have been found to give variable results and do not prevent degradation of the analyte over time.

Applicants have unexpectedly discovered that the use of molybdenum on the inner surfaces of the chemical ionization chamber of a mass spectrometer reduces the adsorption, degradation or decomposition of the analyte and reduces the adverse reactions of gaseous ions on the inner surfaces of the chamber, thereby improving the performance of the mass spectrometer.

Molybdenum has been used to construct various components of mass spectrometers. For example:

(1) U.S. Pat. No. 5,629,519 discloses the use of molybdenum to form the end caps and ring electrodes in a three dimensional quadrupole ion trap.

(2) U.S. Pat. No. 4,883,969 discloses the use of molybdenum to form the ion chamber containing a high-temperature plasma-type ion source, wherein molybdenum is used because of its high melting point.

(3) U.S. Pat. No. 4,845,367 discloses a method and apparatus for producing ions by surface ionization by increasing the molecular energy range, and directing a beam of the substance to impinge against a solid surface with a high work function, such as clean diamond or dirty molybdenum, disposed in the vacuum chamber.

(4) U.S. Pat. No. 3,423,584 discloses a mass spectrometer which includes a gas source and a molybdenum electrode, located outside of the ionization chamber.

However, no one has heretofore constructed an ionization source containing a chemical ionization chamber wherein the inner surfaces of the chamber are formed from molybdenum.

In ion traps and EI sources, ions that are formed by electron impact within the ionization chamber or trap rarely interact with the surfaces of the chamber or trap. As such, it is not usually necessary to prevent adsorption, degradation or decomposition of the analyte ions or to prevent adverse reactions of gaseous ions on the surface because any such secondary ions are not detected and do not interfere with or affect the intended measurement. The degradation of concern in ion traps and EI sources is caused by modification of the neutral analyte by hot surfaces prior to electron impact. In stark contrast to the ion traps and EI sources, ions formed from the analyte in a CI source react with or on the surface of the chamber many times before they exit the chamber. Thus, the type and importance of adsorption, degradation or decomposition experienced in ion traps and EI sources differs significantly from the type and importance of adsorption, degradation or decomposition experienced in CI sources.

It has been found that solutions to the degradation problems in ion traps and EI sources, including the use of inner surfaces of the ionization chamber formed from inert materials, such as gold, nickel and rhodium; chromium and oxidized chromium; or an inert, inorganic non-metallic insulator or semiconductor material, as discussed above, do not solve the degradation problems associated with CI sources. Thus, applicants were particularly surprised to discover that the adsorption, degradation and decomposition of analyte could be reduced by using non-inert molybdenum on the inner surfaces of the chamber containing the CI source while simultaneously improving the performance of the mass spectrometer. Applicants were also surprised to discover that many catalytic reactions expected with chromium surfaces were not a problem with molybdenum surfaces.

SUMMARY OF THE INVENTION

The invention is directed to a mass spectrometer having an ionization source containing a chemical ionization chamber, wherein the inner surfaces of the chamber are formed from molybdenum to reduce adsorption, degradation and decomposition of an analyte and to reduce adverse ion/surface reactions. The invention is also directed a method of reducing adsorption, degradation and decomposition of an analyte and reducing adverse ion/surface reactions in an ionization source containing a chemical ionization chamber of a mass spectrometer including the step of forming the inner surfaces of the chamber from molybdenum. The inner surfaces may formed from molybdenum by constructing the entire chamber or the inner surfaces of the chamber from molybdenum; by depositing, plating or coating molybdenum on the inner surfaces of the chamber; or by a combination thereof. Suitable forms of molybdenum include solid molybdenum, mixtures containing at least 10% by weight molybdenum, and reaction products containing molybdenum.

DETAILED DESCRIPTION OF THE INVENTION

Figure 9:
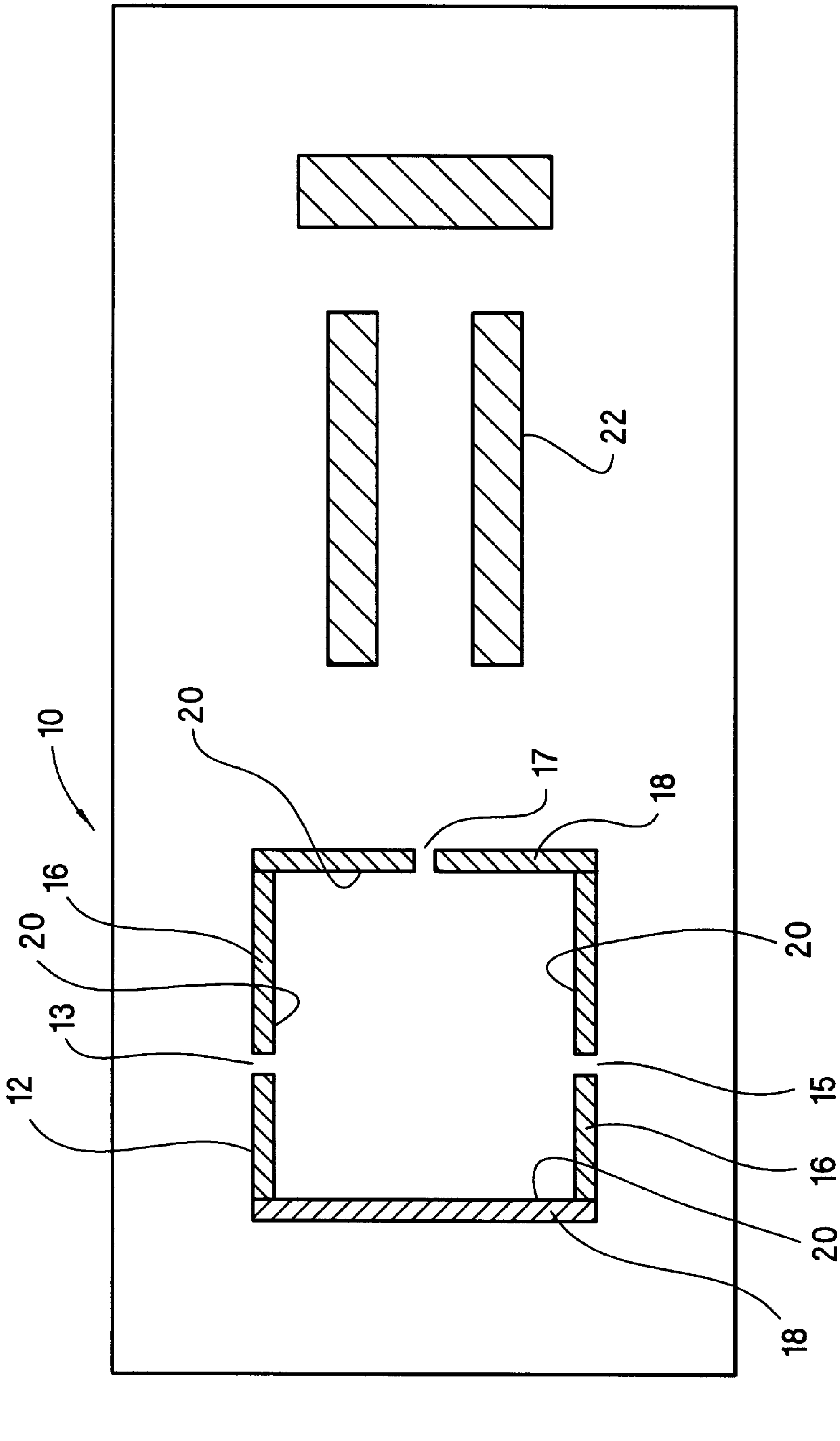
FIG. 9 is a diagrammatic sketch in sectional view thru mass spectrometry apparatus containing a CI chamber according to the invention.

Referring now to FIG. 9, a mass spectrometer 10 for CI typically contains a chamber 12 having a cylindrical sleeve 16 and two end plates 18, wherein the end plates are electrically and physically connected to the sleeve. Both the reagent gas and the analyte are introduced into the chamber through gas-tight seals 13 in the wall of the sleeve. The reagent gas and the analyte are sprayed with electrons having an energy of 50 to 300 eV from a filament through a small orifice 15, generally less than 1 mm in diameter, also in the wall of the sleeve. Ions formed are extracted through a small orifice 17, generally less than 1 mm in diameter, in one of the end plates and introduced into the analyzer or filter 22.

The critical feature of both the mass spectrometer and method of the invention is the use of molybdenum on the inner surfaces 20 of the chemical ionization chamber. Suitable ways to provide molybdenum on the inner surfaces of the chamber include:

(1) by constructing the entire chamber from molybdenum;

(2) by constructing the inner surfaces from molybdenum;

(3) by depositing, plating or coating molybdenum on the inner surfaces of the chamber; or (4) by a combination thereof.

The inner surfaces of the chamber may be constructed from molybdenum by means of an inner sleeve of molybdenum. The molybdenum may be deposited or coated on the inner surface of the chamber, for example, by methods well known in the art, including plasma vapor deposition, flame spray, sputtering in a vacuum, evaporation from heated filaments in a vacuum and the like. In embodiments where the molybdenum only forms the inner surfaces of the chamber, the balance of the chamber may be constructed of any suitable metal, including stainless steel or chromium.

Suitable forms of molybdenum include solid molybdenum, mixtures containing at least 10% by weight molybdenum, and reaction products containing molybdenum.

(1) Solid molybdenum is preferred because it provides improved thermal performance. The solid molybdenum may be arc cast or sintered. Arc cast molybdenum is preferred because it is more reliably machined, more robust and its surfaces are more uniform in density and finish when compared to sintered molybdenum which tends to have voids and flaws, is more brittle and is more easily damaged. Low carbon arc cast molybdenum, i.e., arc cast molybdenum containing less than about 100 parts/million carbon, is more preferred because it provides improved strength relative to high carbon arc cast molybdenum.

(2) Mixtures useful in the invention include alloys, powdered mixtures and sintered mixtures containing at least 10% by weight molybdenum. Suitable alloys of molybdenum include chromium, copper, tungsten, tantalum, zirconium, hafnium and the like. Mixtures containing at least 25% by weight molybdenum are preferred and mixtures containing at least 50% by weight molybdenum are more preferred.

(3) Reaction products containing molybdenum useful in the invention include molybdenum oxides and the like.

Applicants have also discovered that by forming the inner surfaces of the chemical ionization chamber from molybdenum that thermal conductivity is improved and hence, overall performance of the mass spectrometer, when compared with chambers formed from stainless steel or chromium. Applicants believe that the improved thermal conductivity adds greater temperature control, thereby reducing or eliminating “hot spots” and “cold spots” and also providing more efficient thermal equilibration. The result is not only reduced adsorption, degradation and decomposition of an analyte and reduced adverse ion/surface reactions, but also improved analytical peak shape.

It should be understood that the above description is intended to illustrate and not limit the scope of the invention. Other aspects, advantages and modifications within the scope of the invention will be apparent to those skilled in the art to which the invention pertains.

The following examples are put forth so as to provide those of ordinary skill in the art with a complete disclosure and description of how to make and use the apparatus and method of the invention, and are not intended to limit the scope of what the inventors regard as their invention.

EXAMPLES

Example 1—Linear Dynamic Range (Molybdenum v. Stainless Steel)

The linear dynamic range of a mass spectrometer having an ionization source containing a chemical ionization chamber entirely formed from solid arc cast molybdenum was compared with the linear dynamic range of a mass spectrometer having an ionization source containing a chemical ionization entirely formed from stainless steel (comparative).

Benzophenone (MW=182) was analyzed using methane as a reagent gas in the positive CI mode of operation. The $[M+H]^+$ ion at mass=183.1 amu was monitored at a dwell time of 100 milliseconds in single ion mode. One microliter of the benzophenone analyte was injected at five amounts (0.01 ng, 0.1 ng, 1.0 ng, 10 ng and 100 ng). Plots of response as a function of amount for the molybdenum and stainless steel are shown in FIG. 1 and FIG. 2, respectively.

Figure 1:
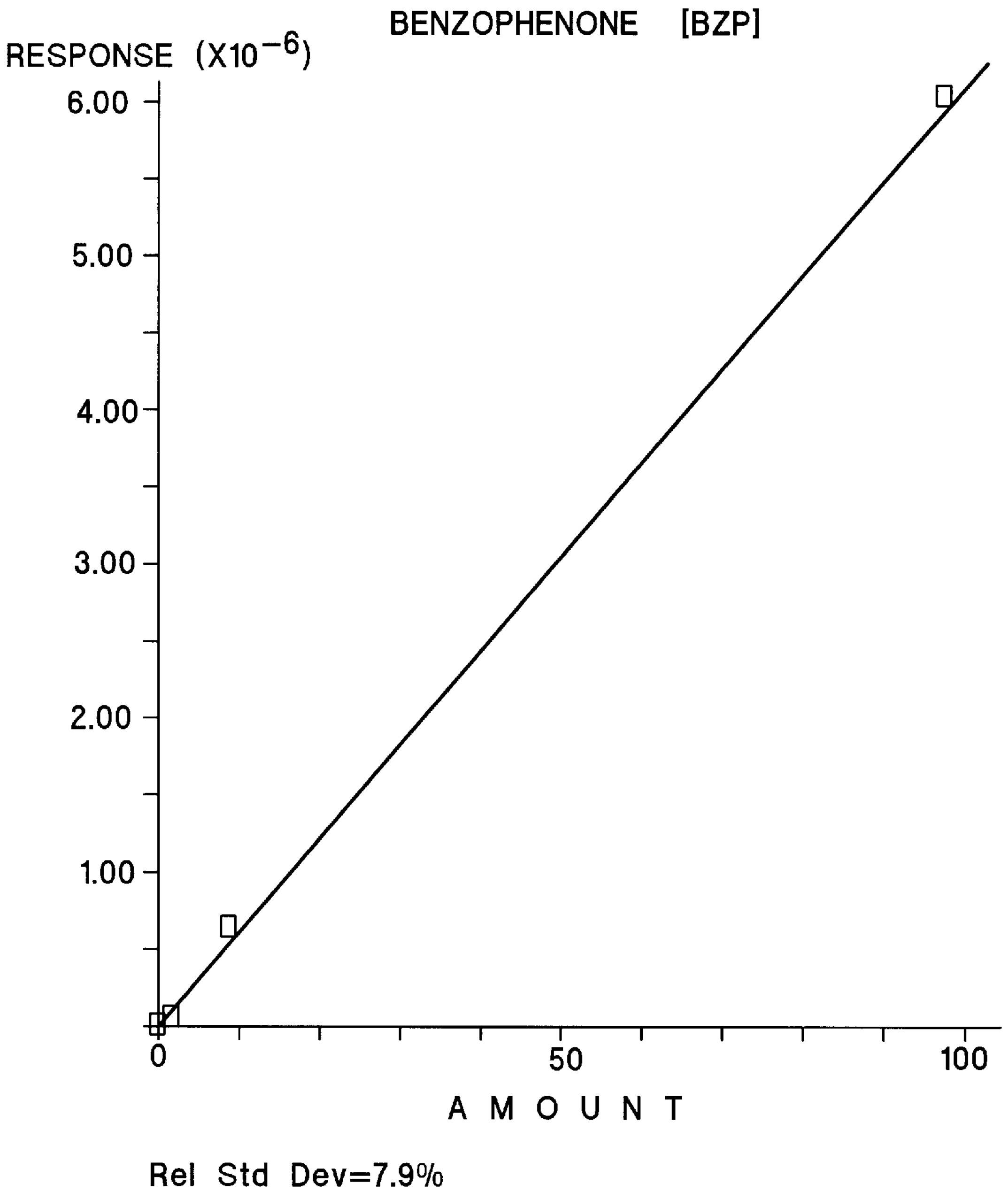
FIG. 1 is a plot of response as a function of concentration for a mass spectrometerhaving an ionization source containing a chemical ionization source entirely formed from solid arc cast molybdenum.
Figure 2:
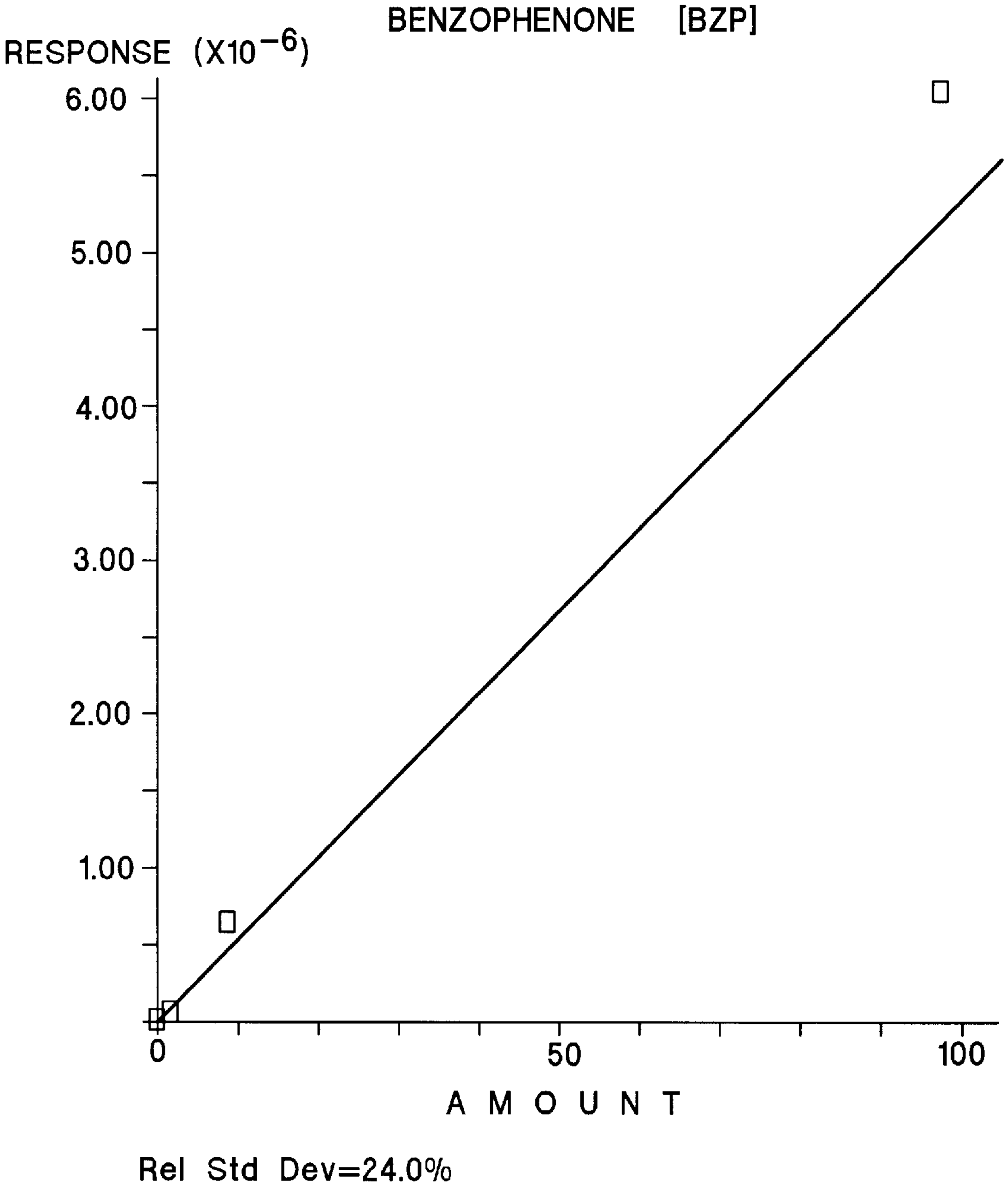
FIG. 2 is a plot of response as a function of concentration for a mass spectrometerhaving an ionization source containing a chemical ionization source entirely formed from stainless steel.

FIG. 1 showed linearity over a dynamic range of four orders of magnitude with a percentage relative standard deviation (% RSD) of only 7.9 for the molybdenum ionization source. FIG. 2 (Comparative) showed linearity over a dynamic range of four orders of magnitude with a percentage relative standard deviation (% RSD) of 24.0 for the stainless steel ionization source.

Example 2—Analytical Peak Tailing (Molybdenum v. Stainless Steel)

The analytical peak tailing of a mass spectrometer having an ionization source containing a chemical ionization chamber entirely formed from solid arc cast molybdenum was compared with the analytical peak tailing of a mass spectrometer having an ionization source containing a chemical ionization entirely formed from stainless steel (Comparative).

Pesticide containing endosulfan sulfate and 4,4'-DDT at an amount of 20 ng was analyzed using methane as a moderating gas in the negative CI mode of operation.

Figure 3:
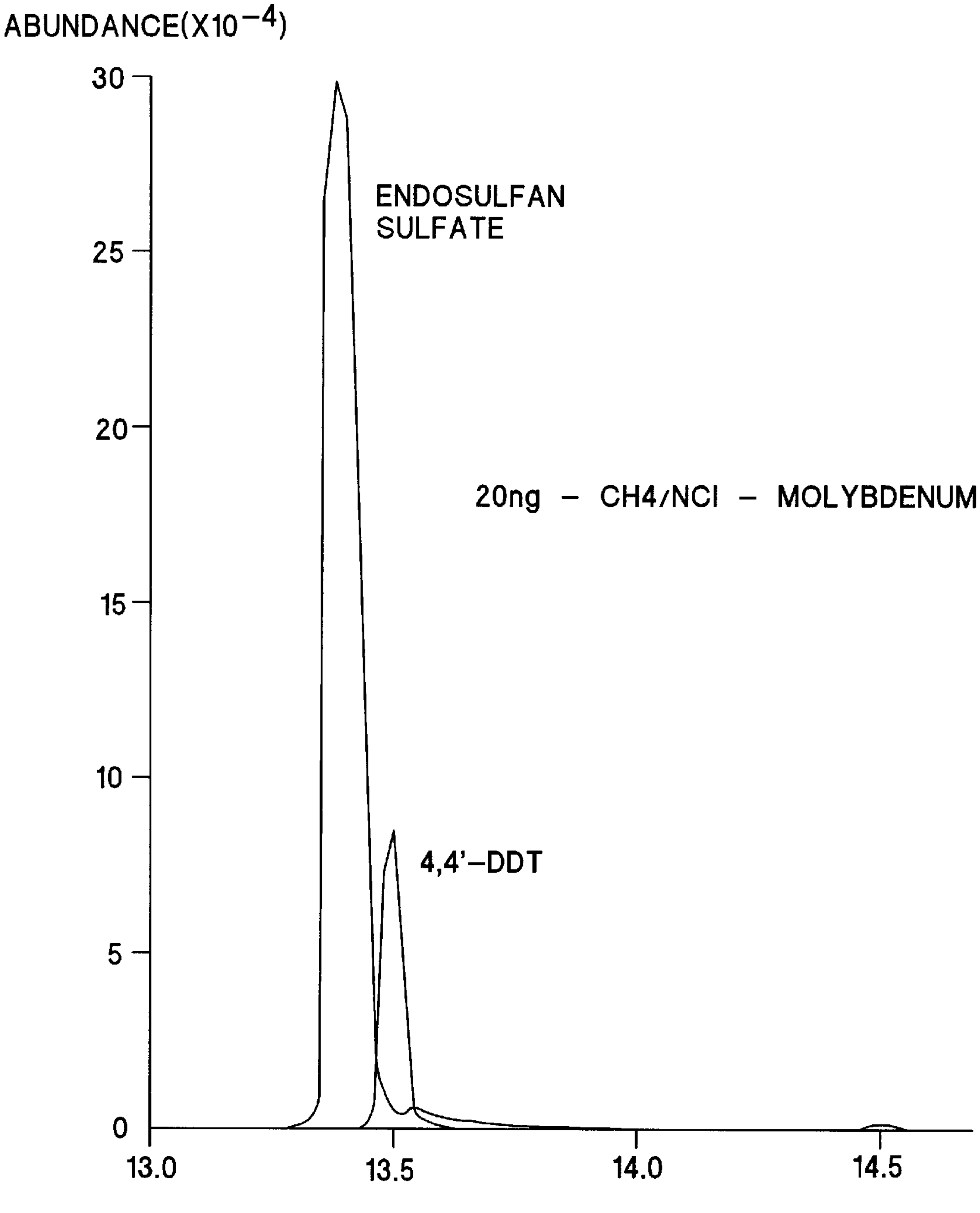
FIG. 3 is an extracted ion chromatogram of a pesticide analyzed using a mass spectrometerhaving an ionization source containing a chemical ionization source entirely formed from solid arc cast molybdenum.
Figure 4:
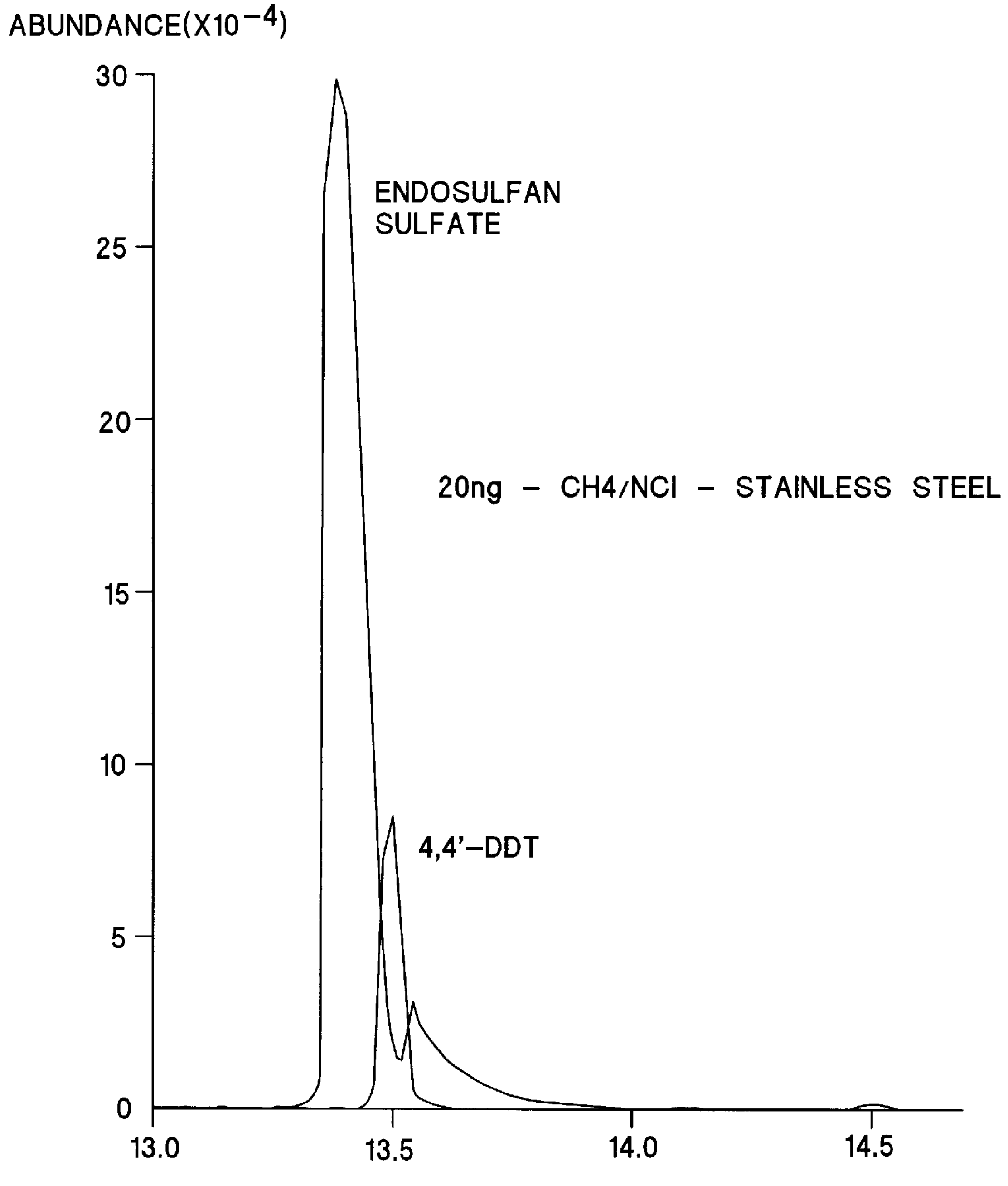
FIG. 4 is an extracted ion chromatogram of a pesticide analyzed using a mass spectrometer having an ionization source containing a chemical ionization source entirely formed from stainless steel.

Chromatograms of the analyte for the molybdenum ionization source and stainless steel ionization source (Comparative) are shown in FIG. 3 and FIG. 4, respectively.

In FIG. 4 (Comparative Stainless Steel), the extracted ion chromatogram (EIC) of the endosulfan sulfate at mass=386 amu showed extreme peak tailing due to surface interactions with the stainless steel ionization source. As the co-eluting peak 4,4'-DDT eluted, the tailing endosulfan sulfate split into two analytical peaks, attributable to the demand for thermal electrons changing as the 4,4'-DDT eluted under the tailing endosulfan sulfate causing the peak to split. In comparison, FIG. 3 (Molybdenum) showed that the analytical peak shape was dramatically improved for the endosulfan sulfate with less analytical peak tailing and reduced analytical peak splitting as the 4,4'-DDT eluted.

Example 3—Sensitivity (Molybdenum v. Stainless Steel)

The sensitivity of a mass spectrometer having an ionization source containing a chemical ionization chamber entirely formed from solid arc cast molybdenum was compared with the sensitivity of a mass spectrometer having an ionization source containing a chemical ionization entirely formed from stainless steel (Comparative).

Figure 5:
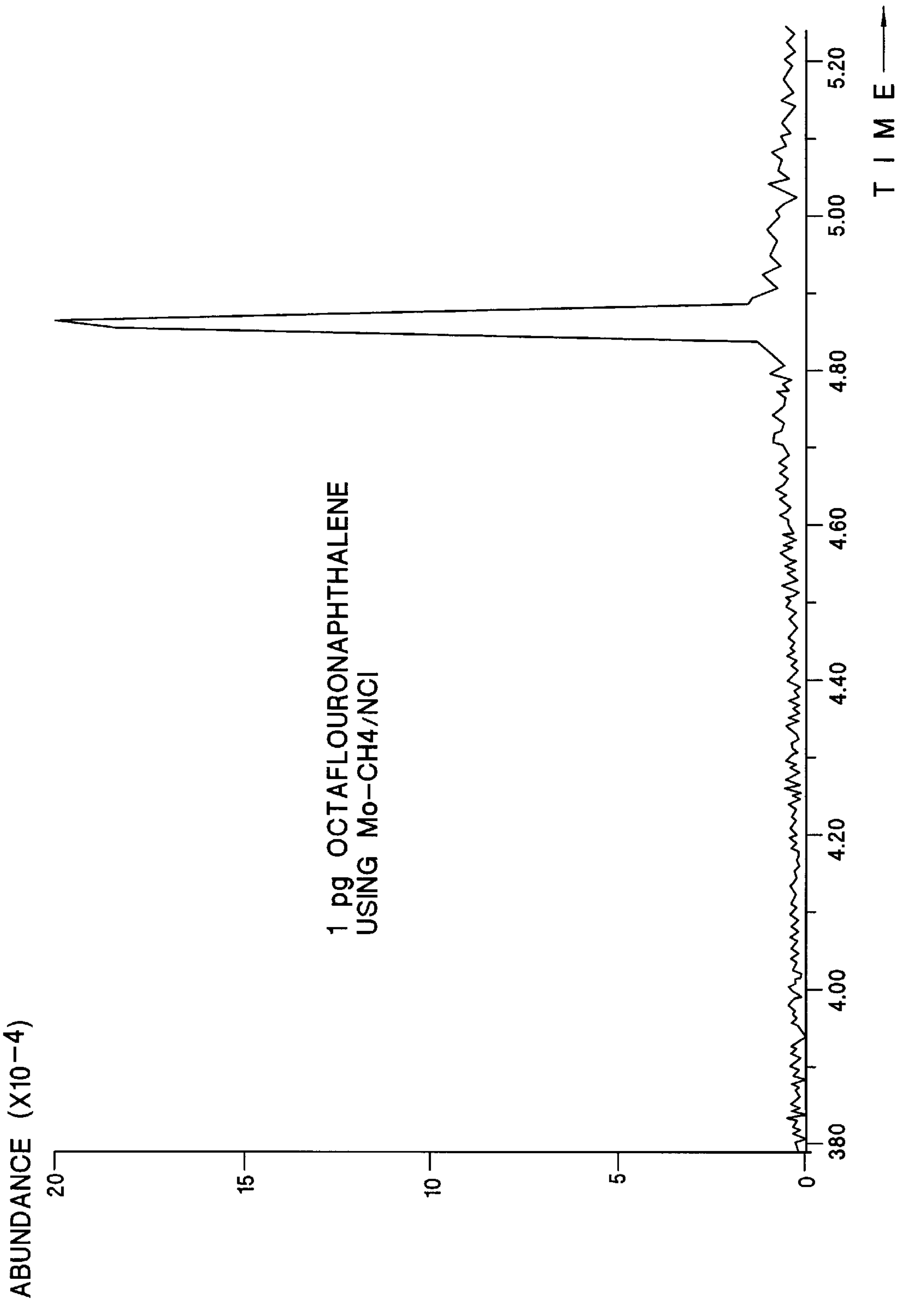
FIG. 5 is a total ion chromatogram of octafluoronaphthalene analyzed using a mass spectrometer having an ionization source containing a chemical ionization source entirely formed from solid arc cast molybdenum.
Figure 6:
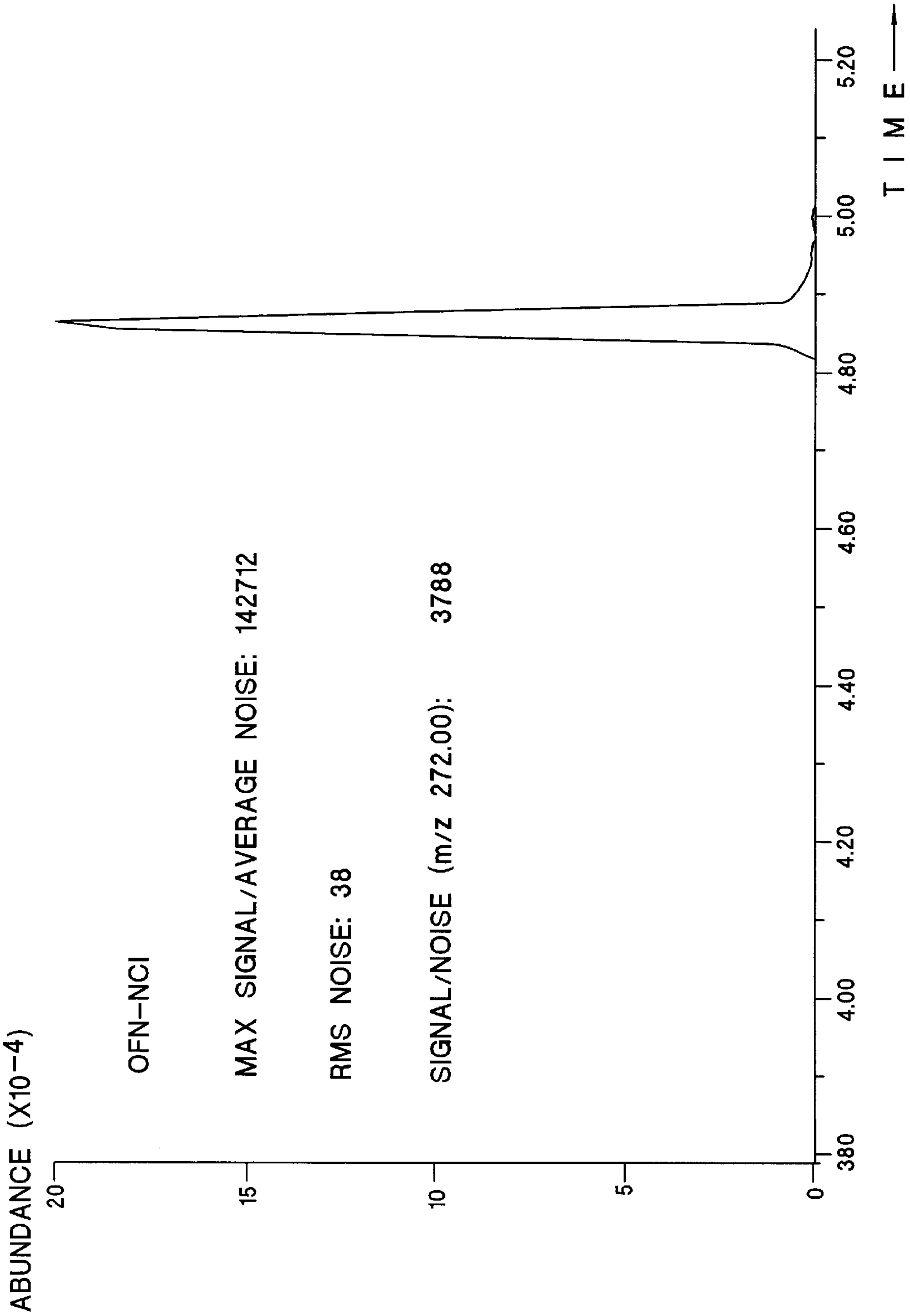
FIG. 6 is an extracted ion chromatogram of octafluoronaphthalene analyzed using a mass spectrometer having an ionization source containing a chemical ionization source entirely formed from solid arc cast molybdenum.
Figure 7:
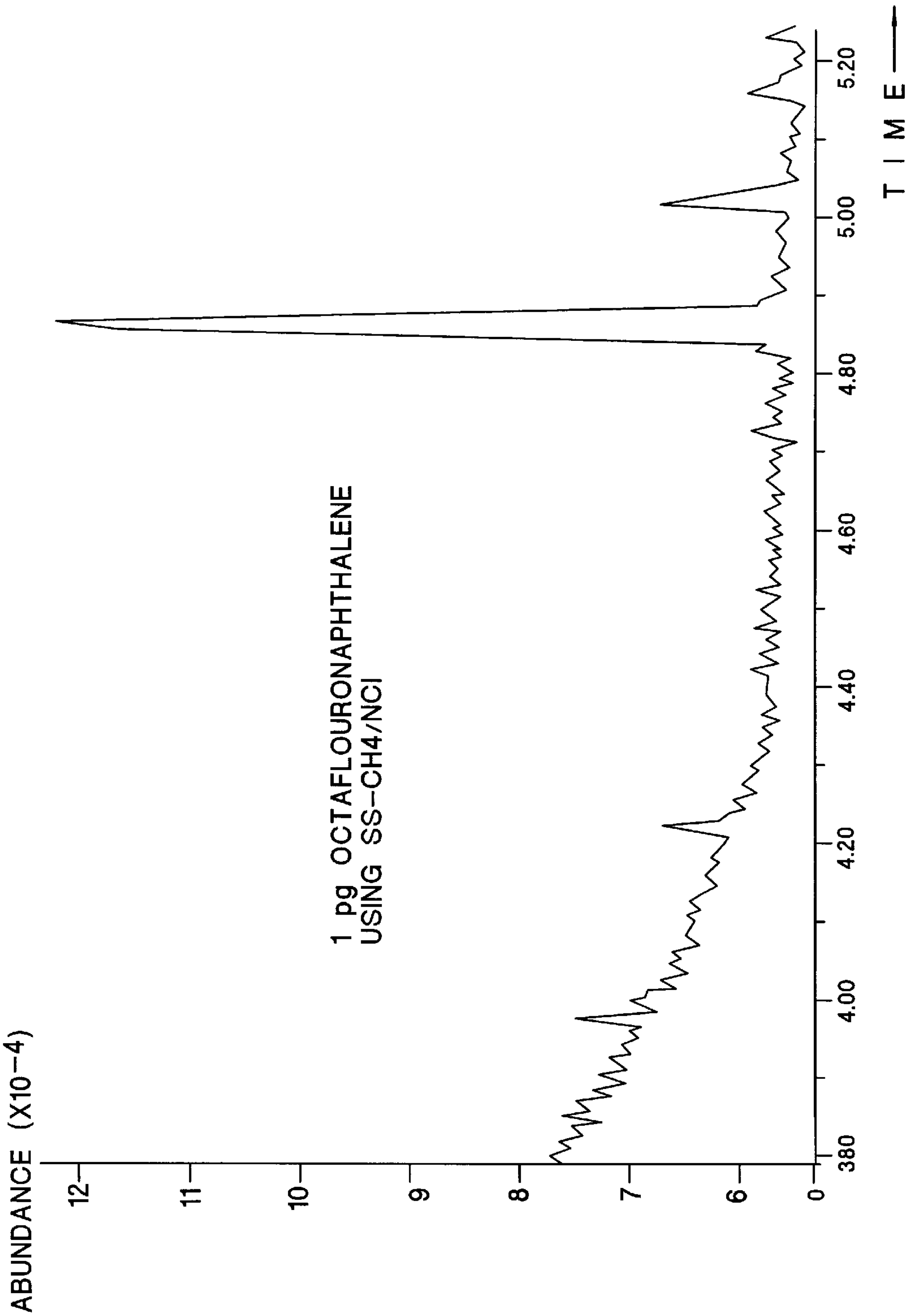
FIG. 7 is a total ion chromatogram of octafluoronaphthalene analyzed using a mass spectrometer having an ionization source containing a chemical ionization source entirely formed from stainless steel.
Figure 8:
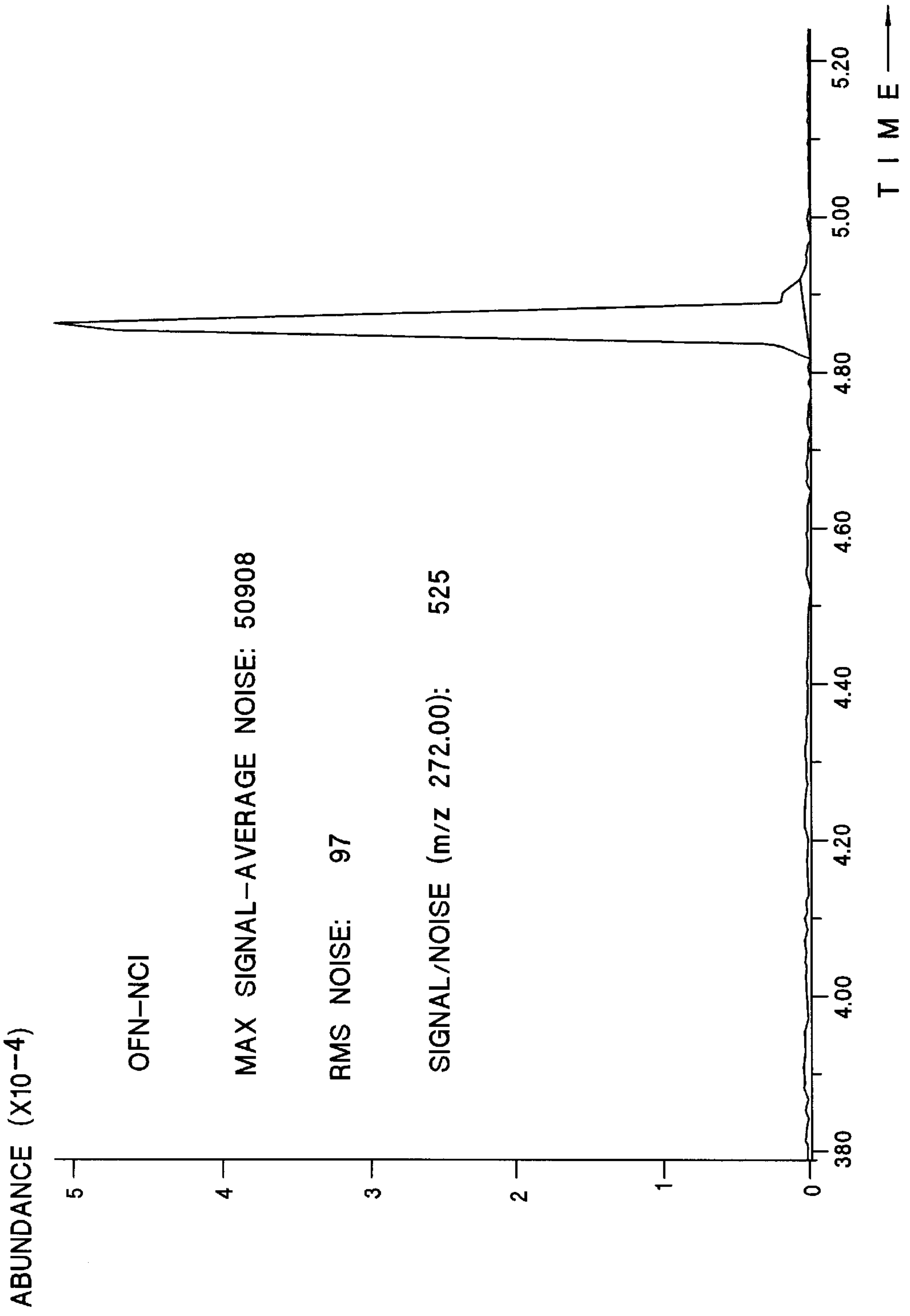
FIG. 8 is an extracted ion chromatogram of octafluoronaphthalene analyzed using a mass spectrometer having an ionization source containing a chemical ionization source entirely formed from stainless steel.

A sample of octafluoronaphthalene in iso-octane (1 pg/$\mu$l) was analyzed using methane as a moderating gas in the negative CI mode of operation. One microliter of the sample was injected using a pulsed splitless injection onto a 0.25 mm×30 m×0.25 $\mu$m HP-5MS column. The data was acquired at 2.94 scans/second over the mass range of 50–300 amu. The total ion chromatogram (TIC) and the extracted ion chromatogram (EIC) at mass=272.0 amu are shown in FIGS. 5 and 6, respectively, for the molybdenum ionization source, and in FIGS. 7 and 8, respectively, for the stainless steel ionization source (Comparative). Sensitivity data for the molybdenum ionization source and the stainless steel ionization source (Comparative) are shown in Table 1.

TABLE 1

| Parameter | Molybdenum | Stainless Steel (Comparative) |
|---|---|---|
| Maximum Signal-Average Noise | 142,712 | 50,908 |
| RMS Noise (4.074–4.574 minutes) | 38 | 97 |
| RMS Signal/Noise (m/z = 272.00) | 3788:1 | 525:1 |

Table 1 shows at least a seven fold (3788/525) improvement for the molybdenum ionization source over the stainless steel (Comparative) ionization source.

While the invention has been described and illustrated with reference to specific embodiments, those skilled in the art will recognize that modification and variations may be made without departing from the principles of the invention as described herein above and set forth in the following claims.

What is claimed is:

1. A mass spectrometer having an ionization source containing a chemical ionization chamber, said chemical ionization chamber comprising means for introducing a reagent gas into said chemical ionization chamber, and said chemical ionization chamber having inner surfaces formed from molybdenum.

2. The mass spectrometer of claim 1 wherein the entire chamber is formed from molybdenum.

3. The mass spectrometer of claim 1 wherein said chamber comprises an inner sleeve formed from molybdenum.

4. The mass spectrometer of claim 1 wherein said surfaces comprise deposited, plated or coated molybdenum.

5. The mass spectrometer of claim 1 wherein said surfaces comprise solid molybdenum.

6. The mass spectrometer of claim 5 wherein said molybdenum is arc cast molybdenum.

7. The mass spectrometer of claim 6 wherein said molybdenum is low carbon arc cast molybdenum.

8. The mass spectrometer of claim 1 wherein said surfaces comprise sintered molybdenum.

9. The mass spectrometer of claim 1 wherein said surfaces comprise a mixture comprising at least 10% by weight molybdenum.

10. The mass spectrometer of claim 9 wherein said mixture comprises an alloy of molybdenum.

11. The mass spectrometer of claim 10 wherein said alloy is an alloy selected from the group consisting of chromium, copper, tungsten, tantalum, zirconium and hafnium.

12. The mass spectrometer of claim 9 wherein said mixture comprises powdered molybdenum.

13. The mass spectrometer of claim 9 wherein said mixture comprises sintered molybdenum.

14. The mass spectrometer of claim 1 wherein said surfaces comprise a mixture comprising at least 25% by weight molybdenum.

15. The mass spectrometer of claim 1 wherein said surfaces comprise a mixture comprising at least 50% by weight molybdenum.

16. The mass spectrometer of claim 1 wherein said surfaces comprise a reaction product comprising molybdenum.

17. The mass spectrometer of claim 16 wherein said reaction product is molybdenum oxide.

18. A method for producing ions from an analyte for mass spectrometry, comprising providing a chemical ionization chamber having inner surfaces, said inner surfaces comprising molybdenum, introducing a reagent gas and the analyte into said chamber, and spraying said reagent gas and said analyte within said chamber with electrons.

19. The method of claim 18 wherein the entire chamber is formed from molybdenum.

20. The method of claim 18 wherein said chamber comprises an inner sleeve formed from molybdenum.

21. The method of claim 18 wherein said surfaces comprise deposited, plated or coated molybdenum.

22. The method of claim 18 wherein said surfaces comprise solid molybdenum.

23. The method of claim 22 wherein said molybdenum is arc cast molybdenum.

24. The method of claim 23 wherein said molybdenum is low carbon arc cast molybdenum.

25. The method of claim 1 wherein said surfaces comprise sintered molybdenum.

26. The method of claim 1 wherein said surfaces comprise a mixture comprising at least 10% by weight molybdenum.

27. The method of claim 26 wherein said mixture comprises an alloy of molybdenum.

28. The method of claim 27 wherein said alloy is an alloy selected from the group consisting of chromium, copper, tungsten, tantalum, zirconium and hafnium.

29. The method of claim 26 wherein said mixture comprises powdered molybdenum.

30. The method of claim 26 wherein said mixture comprises sintered molybdenum.

31. The method of claim 1 wherein said surfaces comprise a mixture comprising at least 25% by weight molybdenum.

32. The method of claim 1 wherein said surfaces comprise a mixture comprising at least 50% by weight molybdenum.

33. The method of claim 1 wherein said surfaces comprise a reaction product comprising molybdenum.

34. The method of claim 33 wherein said reaction product is molybdenum oxide.

* * * * *